Patented Nov. 11, 1941

2,262,736

UNITED STATES PATENT OFFICE 2,262,736

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 27, 1940, Serial No. 342,734

8 Claims. (Cl. 252—344)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

We have found that if certain acylation products of the kind exemplified by the reaction product of ricinoleic acid and tris(hydroxymethyl)aminomethane, are reacted further with ethylene oxide, butylene oxide, or a functional equivalent, one obtains a type of glycol ether which has unusual effectiveness as a demulsifier.

It is immaterial how the compound or compounds herein contemplated are manufactured. They are most conveniently manufactured by first producing the acylation product derived by reaction between ricinoleic acid, or a ricinoleic acid body of the kind subsequently described and tris(hydroxymethyl)aminomethane, or a homolog or analog thereof. Such product is then treated further with a material such as ethylene oxide, propylene oxide, butylene oxide, amylene oxide, glycid, epichlorhydrin, and the like, to produce glycol ethers of the kind herein contemplated, both as compositions of matter and as demulsifiers.

Reactions of the first kind just referred to are concerned with the introduction of an acyl radical, for instance, a ricinoleyl radical, into an amine of the kind just mentioned. Such acylation may take place by virtue of an amidification reaction, or by virtue of an esterification reaction. For sake of convenience, in the hereto appended claims both types of reactions, amidification and esterification, will be referred to as acylation reactions. In other words, reference to an acylation reaction is not intended to differentiate between whether an esterification reaction takes place, or an amidification reaction takes place, or if both take place.

Ricinoleic acid is most readily available in the form of castor oil, which contains about 85% tricinolein. Instead of ricinoleic acid, one may employ monoricinolein, diricinolein, methyl ricinoleate, ethyl ricinoleate, benzyl ricinoleate, cyclohexyl ricinoleate, etc. Similarly, one may employ polyricinoleic acid, such as diricinoleic acid, triricinoleic acid, and tetraricinoleic acid; or one may employ the dibasic type of diricinoleic acid. Obviously, ricinoleic acid esters can be derived from polyhydric alcohols other than glycerol, for instance, from the various glycols, polyglycols, polyglycerols, methyl glycerol, and the like. Ordinarily, one would employ the cheapest source of the ricinoleic acid radical, which is castor oil. Slightly blown castor oil, or the like, may be used.

Castor oil can be treated with one mole or two moles of glycerol, or any intermediate quantity, to produce a material consisting largely of diricinolein, monoricinolein, and some triricinolein, with perhaps a small amount of free glycerol. Such material is commonly referred to as superglycerinated castor oil, or superglycerinated triricinolein. Such mixture may be considered as typical ricinoleic acid body.

Having indicated the variety of ricinoleic acid compounds which may be employed, reference will now be made to the type of amine intended for reaction. It is well known that paraffins can be treated with nitric acid, so as to produce nitroparaffins or nitrites. Such nitroparaffins can be treated with aldehydes, particularly aliphatic aldehydes, having four carbon atoms, or less, so as to produce nitroparaffins in which 1, 2, or 3 hydroxyl alkyl radicals have been introduced, and particularly, characterized by the fact that such nitroparaffins may have two or three alkylol groups attached to the same carbon atom. Such nitroparaffins can readily be converted into the corresponding amine. See "Chemical Industries," volume 45, No. 7, pages 664–668, December, 1939. See also "Industrial & Engineering Chemistry," volume 32, No. 1, page 34.

Well known examples of amines of the kind described are:

2-amino-2-methyl-1,3-propanediol

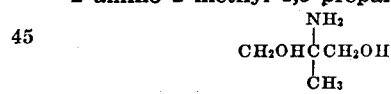

2-amino-2-ethyl-1,3-propanediol

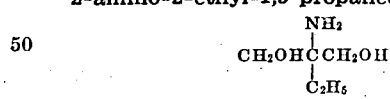

Tris(hydroxymethyl)aminomethane $NH_2C(CH_2OH)_3$

Such amines may be indicated by the following formula type:

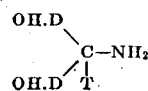

in which D represents a divalent radical, such as the methylene radical, and T may be a hydrogen atom, or the same as OH.D, or may represent a monovalent hydrocarbon radical, particularly an alkyl radical. In other words, the nature of T may vary with the particular paraffin selected, and the molal reaction ratio between the nitroparaffin and aldehyde in the event the paraffin is methane. Needless to say, such reactions between an aldehyde and a nitroparaffin may yield a monohydric alcohol, as distinguished from a nitro-diol or nitro-triol, in the event the paraffin is methane. Such monohydroxylated compound can be converted into an alkylolamine, if such alkylolamine, as, for example, 2-amino-1-butanol, is not herein contemplated for reaction with condensation products or esterification products of the kind previously described. Of various aldehydes employed for reaction with the nitroparaffins, formaldehyde, acetaldehyde, and butyraldehyde are to be preferred, with formaldehyde being particularly desirable. Cyclic aldehydes, such as benzaldehyde, or hexahydrobenzaldehyde, give very inferior yields.

Having obtained an amine of the kind above described, which is a primary amine, it can readily be converted into a secondary or tertiary amine by any of the procedures commonly employed for introducing an alkyl or similar monovalent hydrocarbon radical. By means of suitable alkylating agents, one may introduce alkyl groups, aryl radicals, aralkyl radicals, alicyclic radicals, hydroxy hydrocarbon radicals, and the like. Convenient reagents for such reactions include alkyl chlorides, such as butyl chloride, benzyl chloride, phenyl chloride, ethyl bromide, glycerol chlorhydrin, ethylene chlorhydrin, ethylene oxide, propylene oxide, diethyl sulfate, ethyl chloracetate, etc. The result of an alkylation reaction or the equivalent usually results in the formation of an amine salt, such as the amine hydrochloride. The liberation of the free amine depends upon conventional treatment with caustic soda or the like. Treatment with a reactive alkylene oxide, such as ethylene oxide, propylene oxide, and the like does not result in the formation of a salt, and thus in many ways is a more suitable procedure. It should be noted that the hydroxyl, which is part of the radical OH.D, is reactive towards alkylating agents. In some instances, perhaps, such hydroxyl hydrogen atom is more reactive than the amino hydrogen atom, and perhaps in other instances not so reactive. The speed of the reactions depends, of course, upon the reactants selected and the conditions of the reaction. However, it is to be noted that such reaction may result in the formation of an ether group. This may be illustrated by involving a butyl chloride and a hydroxyl hydrogen atom, thus:

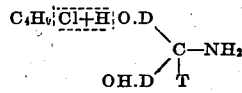

In this instance the radical C₄H₉.O.D. represents an alkoxyalkyl radical, in which D might be obtained from any one of the aldehydes mentioned, for example, acetaldehyde or butyraldehyde; and the butyl radical might be replaced by some other radical, such as the hexyl radical, benzyl radical, cyclohexyl radical, or the like.

If ethylene oxide, propylene oxide, or the like are used to react with the hydrogen atom previously referred to, then the reaction proceeds as follows:

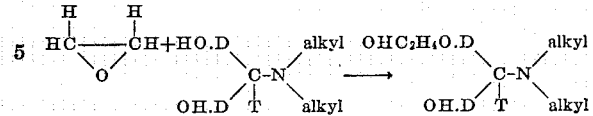

Thus, examining the class of compounds in the broadest aspect, they may be rewritten as:

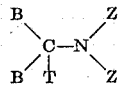

in which B represents a monovalent hydroxy hydrocarbon radical, preferably an alkylol radical, or may be a monovalent oxyhydrocarbon radical, in which the carbon atom chain is interrupted at least once by an oxygen atom, or may be a hydroxylated oxyhydrocarbon radical, which, in addition to having at least one hydroxyl radical, has the carbon atom chain interrupted at least once by an oxygen atom. Reactants such as glycerol monochlorhydrin, or the corresponding chlorhydrins derived from di- or triglycerol, would permit the introduction of radicals containing more than one hydroxyl group, and being interrupted more than once by an oxygen atom. T may be the same as B, or may be a hydrogen atom, or any alkyl radical. Z represents a hydrogen atom, or may represent any monovalent hydrocarbon radical, hydroxy hydrocarbon radical, hydroxy oxyhydrocarbon radical, characterized by having a hydroxyl radical and having a carbon atom chain interrupted at least once by oxygen, or a radical derived by hypothetical removal of an alphahydrogen atom from a carboxy acid ester. It is to be noted that the preferred amine is of the type which contains no aryl radicals, particularly no aryl radicals attached to the amino nitrogen atom, and is preferably of the primary amine type. Due to its availability, the amine which we prefer to employ is tris(hydroxymethyl) aminomethane.

It is obvious, in view of what has been said, that the acylation products obtained may be of the type is which all acyl radicals present are in the amido form. Compounds may be of the type in which all acyl radicals present are in the ester form. It is also possible to have a series of compounds which exhibit both the amido form and the ester form. Furthermore, it is obvious that an amine of the kind contemplated cannot react with a ricinoleic acid body, unless there is present either an alcoholiform hydroxy, or an amino hydrogen atom. Of course, both forms of reactive hydrogen atoms may be present, a hydrogen of the alcoholic radical being referred to as a reactive hydrogen atom. With this in mind, in the hereto appended claims the expression "acylation-reactive amine" is employed to designate such amine which is reactive in regard to acylation reactions of the kind described.

As is apparent to a person skilled in the art of acylation reactions of the kind referred to, one can select reactants and conditions of reaction so as to obtain primarily one particular type, or primarily another particular type. These variations will be described in some of the following examples:

*Acylation product, Example 1*

A molecular proportion of tris(hydroxymethyl)-methyl dibutylamine is treated with 1 mole of ricinoleic acid and heated until one obtains an ester with the elimination of water. Insofar that the original amine employed contains no replaceable amino hydrogen atom, obviously, the only compound obtainable is the ester form.

*Acylation product, Example 2*

A molecular proportion of tris(hydroxymethyl)methyl butylamine is treated with 1 mole of ricinoleic acid and heated until one obtains an ester with the elimination of water.

*Acylation product, Example 3*

A molecular proportion of tris(hydroxymethyl)methyl butylamine is treated with one mole of ethyl ricinoleate. The esters preferentially react with replacement of an amino hydrogen atom, rather than an alcoholiform hydroxyl hydrogen atom. Thus, the above reaction can be conducted in a manner to produce the amide in generous yields.

*Acylation product, Example 4*

One mole of tris(hydroxymethyl)aminomethane is treated with one mole of ricinoleoamide in the conventional manner to eliminate ammonia, and form the ricinoleic acid amide of tris(hydroxymethyl)aminomethane.

*Acylation product, Example 5*

One molecular proportion of tris(hydroxymethyl)aminomethane is treated with two moles of ricinoleic acid until one forms the amide ester. Theoretically, one can form a secondary amide, i. e., an amide in which two amino hydrogen atoms attached to the same amino nitrogen atom have been replaced by an acyl radical. However, the introduction of the second amide group attached to the same amino nitrogen is rather difficult to obtain under ordinary conditions of reaction; and thus, actually one introduces the second acyl group in the ester form.

*Acylation product, Example 6*

Tris(butyloxymethyl)aminomethane is treated with 1 mole of ricinoleic acid to form the corresponding amide of the following formula:

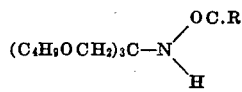

in which OC.R represents the acyl radical derived from ricinoleic acid. If a slightly additional amount of ricinoleic acid is employed, and if conditions producing acylation are raised to a point just short of decomposition temperature and reaction is continued for a long while, one obtains a minor proportion of the tertiary amide of the following composition:

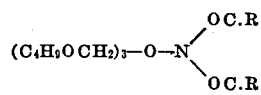

However, other means may be employed to obtain predominantly one type or the other. For instance, if one has the amide, or a mixture of the amide and ester type, one can convert the same to the ester type by reaction with a dilute acid. The reason such procedure can be employed is that apparently there is an equilibrium between the amide type and the ester type, especially when heated; and the ester type is basic and dissolves in the acid, thus upsetting the equilibrium. For instance, reference is made to U. S. Patent No. 2,151,788, dated March 28, 1939, to Mauersberger, in which such conversion is illustrated, for instance, in connection with an amide derived from monoethanolamine and oleic acid by the use of 85% lactic acid. Such procedure is applicable in connection with the compounds herein contemplated.

It is to be noted that the previous examples of suitable acylation products are characterized by being susceptible to oxy-alkylation. For instance, there is present an amino hydrogen atom, which is reactive towards ethylene oxide or the like, or else there may be present a primary alcohol radical, particularly the hydroxyethyl radical. In some instances where there is another type of reactive hydrogen atom, it will be found in the secondary alcohol radical, which is part of the ricinoleyl radical. Having obtained a suitable acylation derivative of ricinoleic acid, or an obvious chemical equivalent and tris(hydroxymethyl)aminomethane or the like, one subjects such product to oxyalkylation, preferably with ethylene oxide, propylene oxide, or the like. It is preferable that the acylation product be water-insoluble prior to treatment with alkylene oxide and that it becomes water-soluble upon treatment with an alkylene oxide or its equivalent.

It should be noted that the treatment with an alkylene oxide or its equivalent is necessary in all instances to produce water solubility, if the product is previously insoluble; yet excessive treatment should be avoided, in that the compound may become too hydrophile. Generally speaking, it is safe to treat the water-insoluble acylation product of the kind described with ethylene oxide, so as to increase its weight not less than 150%, and usually not more than 250%, and possibly 300% in some cases. Such procedure is generally a satisfactory guide; and if some other alkylene oxide is employed, for instance, propylene oxide, then, of course, an increased amount of alkylene oxide must be employed, based on the increased molecular weight of the propylene oxide and the like, and also based on the fact that its solubilizing effect per mole is somewhat less than that of ethylene oxide. If too great an amount of ethylene oxide is used, the resultant product passes through a water-soluble, surface-active stage, and then reaches an advanced stage, where it is water-soluble, but substantially free from surface activity. Generally speaking, five or six to fifteen moles of ethylene oxide or the equivalent per mole of the acylation product of the kind described is sufficient.

Another convenient guide is that for each carbon atom present in the original acylation product, preferably a water-insoluble acylation product, one must add one-half molecular proportion of ethylene oxide, and possibly a greater amount of an alkylene oxide of higher molecular weight, if employed. It must also be remembered that the solubility of the product obtained varies somewhat with the method of manufacture and the particular catalyst which is present. It may be well to indicate that this is one of the reasons that the exact composition of the compounds cannot be indicated as satisfactorily as might be desired in all instances. If solubility is not obtained with any other alkylene oxide, then ethylene oxide should be employed, because it appears to be best suited, for the reason that it reacts most readily, and because it promotes water solubility to a greater degree than other alkylene oxides or the equivalent. Glycid, of course, or a similar compound is just as satisfactory as ethylene oxide. In any event, water solubility can always be obtained; and the range of surface activity is such that there is no difficulty in stopping short of the point where surface activity will disappear, due to the presence of unusually excessive hydrophile properties.

It may be well to emphasize what has been said previously in regard to surface activity of the water-soluble compound. If a dilution of the water-soluble reaction product of one part in 3,000, or one part in 5,000, or one part in 20,000, no longer shows any decrease in the surface tension of the resulting solution, as compared with the raw water from which it was prepared, then one has obtained a water-soluble product from the parent water-insoluble material; but surface activity has been destroyed, due to the introduction of an extremely hydrophile property. Needless to say, such product should be removed and the changes made in the introduction of the alkylene oxide along the lines previously indicated, so as to obtain a product which is water-soluble and also surface active. In order that it be understood that such extremely hydrophile compounds are not contemplated for use in the present process, it should be noted that the hereto appended claims are limited to the surface-active type and self-emulsifying type.

As has been previously stated, it is our preference to treat a water-insoluble acylation product in such a manner as to obtain a water-soluble surface-active derivative. However, it is understood that even where the product is water-soluble prior to oxy-alkylation, one obtains a new type of material by subjecting the same to oxy-alkylation, provided that surface-active properties have not disappeared. Furthermore, in some instances, especially where the acylation product contains only a secondary alcohol grouping and no amino hydrogen atom, it may happen that the product produces a self-emulsifying oil, when subjected to oxy-acylation, but does not produce a soluble surface-active material. We have found that such self-emulsifying oil type is valuable in many instances, and yields an effective demulsifying agent. Our preference, however, is to employ the water-insoluble acylation product and treat the same with ethylene oxide, propylene oxide, or the like until one has obtained a soluble surface-active material. In every instance we prefer to employ ethylene oxide or the like in such amount that at least three moles of the alkylene oxide are introduced for each mole of raw material.

Furthermore, it is to be pointed out that the products herein contemplated are not limited to any particular method of manufacture. It may be desirable to react the ethylene oxide with the selected acylation product of the kind described in several stages, and to test the material at the end of each stage. In other words, oxy-alkylation may be carried out in a two-stage process, a three-stage process, a four-stage process, or the like. This will be obvious to a person skilled in the art. Furthermore, it is not necessary that all stages be carried out with propylene oxide or butylene oxide, and subsequent stages with ethylene oxide. Indeed, we have found it convenient to treat the selected acylation product of the kind described with one mole or two moles of the alkylene oxide, such as ethylene oxide, and then employ the hydroxy ether so obtained as a raw material for subsequent oxy-alkylation. The following are examples of demulsifying agents capable of use in practising our process.

*Composition of matter, Example 1*

"Acylation product, Example 1" is treated with ethylene oxide in the presence of approximately ¼% of suspended sodium methylate. As the reaction proceeds, the sodium methylate either dissolves, or is converted into the soluble compound by chemical combination. Reaction is conducted at approximately 125° C. and 200–250 lbs. pressure. It is preferable that the oxy-acylation take place in three steps. In the first step, approximately six moles of ethylene oxide are introduced for each mole of amine employed in the manufacture of the acylated derivative. In the second stage, another five-mole portion is reacted; and in the final stage the third five-mole portion is reacted. If desired, the second and third stages or simply the third stage may be omitted. The products obtained at the completion of all three stages represent valuable compounds or mixtures of compounds which may be used for purposes of breaking oil field emulsions and may serve other useful purposes.

*Composition of matter, Example 2*

Propylene oxide is substituted for ethylene oxide in the previous example.

*Composition of matter, Example 3*

Glycid is substituted for ethylene oxide in Example 1.

*Composition of matter, Example 4*

"Acylation product, Examples 2, 3, 4, 5, and 6" are substituted for "Acylation product, Example 1" in the three preceding examples.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as the down-the-hole procedure, i. e., bringing the demulsifier in contact with the fluids of the well at the bottom of the well or at some point prior to their emergence. This particular type of application is decidedly feasible when the demulsifier is used in connection with acidification or calcareous oil-bearing strata, especially if suspended in or dissolved in the acid employed for acidification.

Having thus described our invention, what we claim as new and desire to secure by Letters Patent is:

1. A process for breaking petroleum emulsions of the water-in-oil type, consisting in subjecting the emulsion to the action of a demulsifier comprising a polyglycol ether produced by reacting an alkylene oxide with an acylation product derived by reaction between a ricinoleic acid body and an acylation-reactive amine of the type:

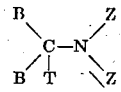

in which B is selected from the class consisting of hydroxy hydrocarbon radicals, ether-type oxyhydrocarbon radicals, and hydroxylated ether type oxyhydrocarbon radicals; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester; said alkylene oxide being employed in the proportion of at least 5 moles of alkylene oxide for each mole of acylation product, and below the ratio where said acylation product is converted into a non-surface active, water-soluble compound.

2. A process for breaking petroleum emulsions of the water-in-oil type, consisting in subjecting the emulsion to the action of a demulsifier comprising a polyglycol ether produced by reacting an alkylene oxide with a water-insoluble acylation product derived by reaction between a ricinoleic acid body and an acylation-reactive amine of the type:

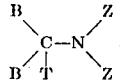

in which B is selected from the class consisting of hydroxy hydrocarbon radicals, ether-type oxyhydrocarbon radicals, and hydroxylated ether type oxyhydrocarbon radicals; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester; said alkylene oxide being employed in the proportion of at least 5 moles of alkylene oxide for each mole of acylation product, and below the ratio where said acylation product is converted into a non-surface active, water-soluble compound.

3. A process for breaking petroleum emulsions of the water-in-oil type, consisting in subjecting the emulsion to the action of a demulsifier comprising a surface-active polyglycol ether produced by reacting an alkylene oxide with a water-insoluble acylation product derived by reaction between a ricinoleic acid body and an acylation-reactive amine of the type:

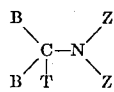

in which B is selected from the class consisting of hydroxy hydrocarbon radicals, ether-type oxyhydrocarbon radicals, and hydroxylated ether-type oxyhydrocarbon radicals; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester; said alkylene oxide being employed in the proportion of at least 5 moles of alkylene oxide for each mole of acylation product, and below the ratio where said acylation product is converted into a non-surface active, water-soluble compound.

4. A process for breaking petroleum emulsions of the water-in-oil type, consisting in subjecting the emulsion to the action of a demulsifier comprising a surface-active polyglycol ether produced by reacting an alkylene oxide containing at least 2 carbon atoms and not more than 4 carbon atoms with a water-insoluble acylation product derived by reaction between a ricinoleic acid body and an acylation-reactive amine of the type:

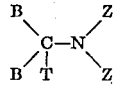

in which B is selected from the class consisting of hydroxy hydrocarbon radicals, ether-type oxyhydrocarbon radicals, and hydroxylated ether-type oxyhydrocarbon radicals; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester; said alkylene oxide being employed in the proportion of at least 5 moles of an alkylene oxide having at least 2 carbon atoms and not more than 4 carbon atoms for each mole of acylation product, and below the ratio where said acylation product is converted into a non-surface active, water-soluble compound.

5. A process for breaking petroleum emulsions of the water-in-oil type, consisting in subjecting the emulsion to the action of a demulsifier comprising a surface-active polyglycol ether produced by reacting ethylene oxide with a water-insoluble acylation product derived by reaction between a ricinoleic acid body and an acylation-reactive amine of the type:

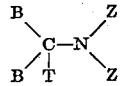

in which B is selected from the class consisting of hydroxy hydrocarbon radicals, ether-type oxyhydrocarbon radicals, and hydroxylated ether-type oxyhydrocarbon radicals; T may be selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester; said ethylene oxide being employed in the proportion of at least 5 moles of ethylene oxide for each mole of acylation product, and below the ratio where said acylation product is converted into a non-surface active, water-soluble compound.

6. A process for breaking petroleum emulsions of the water-in-oil type, consisting in subjecting the emulsion to the action of a demulsifier comprising a surface-active polyglycol ether produced by reacting ethylene oxide with a water-insoluble acylation product derived by reaction between a ricinoleic acid body and an acylation-reactive amine of the type:

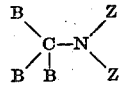

in which B is selected from the class consisting of hydroxy hydrocarbon radicals, ether-type oxyhydrocarbon radicals, and hydroxylated ether-type oxyhydrocarbon radicals; and Z represents a member of the class consisting of hydrogen atoms, hydrocarbon radicals, oxyhydrocarbon radicals, and radicals derived by removal of an alpha hydrogen atom from a carboxy acid ester; said ethylene oxide being employed in the proportion of at least 5 moles of ethylene oxide for each mole of acylation product, and below the ratio where said acylation product is converted into a non-surface active, water-soluble compound.

7. A process for breaking petroleum emulsions of the water-in-oil type, consisting in subjecting the emulsion to the action of a demulsifier comprising a surface-active polyglycol ether produced by reacting ethylene oxide with a water-insoluble acylation product derived by reaction between a ricinoleic acid body and an acylation-reactive amine of the type:

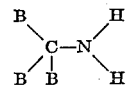

in which B is selected from the class consisting of hydroxy hydrocarbon radicals, ether-type oxyhydrocarbon radicals, and hydroxylated ether-type oxyhydrocarbon radicals; said ethylene oxide being employed in the proportion of at least 5 moles of ethylene oxide for each mole of acylation product, and below the ratio where said acylation product is converted into a non-surface active, water-soluble compound.

8. A process for breaking petroleum emulsions of the water-in-oil type, consisting in subjecting the emulsion to the action of a demulsifier comprising a surface-active polyglycol ether produced by reacting ethylene oxide with a water-insoluble acylation product derived by reaction between a ricinoleic acid body and an acylation-reactive amine of the type:

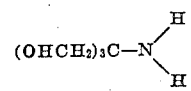

said ethylene oxide being employed in the proportion of at least 5 moles and not more than 15 moles of ethylene oxide for each mole of acylation product, and below the ratio where said acylation product is converted into a non-surface active, water-soluble compound.

MELVIN DE GROOTE.
BERNHARD KEISER.